Patented July 28, 1953

2,647,124

UNITED STATES PATENT OFFICE 2,647,124

METHOD OF PREPARING SULFURIC ACID HALF ESTERS OF LEUCO ANTHRAQUINONES IN MILDLY ALKALINE AQUEOUS MEDIUM

William B. Hardy and Elizabeth M. Hardy, Bound Brook, N. J., assignors to American Cyanamid Company, New York, N. Y., a corporation of Maine No Drawing. Application July 24, 1950, Serial No. 175,664

17 Claims. (Cl. 260—303)

This invention relates to an improvement in the preparation of sulfuric acid half esters of leuco anthraquinones, and particularly to vat dyestuffs containing the meso anthraquinone configuration. More particularly, the invention relates to an improvement in the process of United States Patent 2,403,226, and is especially applicable to leuco anthraquinones, which are generally subject to over-reduction in aqueous esterification reactions.

Sulfuric acid half esters of leuco anthraquinone and other leuco vat dyestuffs have achieved large commercial usefulness, particularly in the dyeing of alkali-sensitive materials. The original processes for the preparation of the sulfuric acid half esters involved the reaction of the leuco compounds with sulfur trioxide addition products of tertiary heterocyclic amines, such as pyridine, in substantially anhydrous medium. The processes were expensive and in some cases required special equipment or precautions. The production of sulfuric acid half esters of leuco anthraquinones was greatly simplified and improved by the development of a modern process using sulfur trioxide addition products of strong tertiary amines in aqueous medium. This process is described and claimed in United States patent of Lecher, Scalera and Lester, No. 2,403,226.

With many dyestuffs the process of United States Patent 2,403,226 gives excellent results. However, in the case of some compounds, including anthraquinone itself, difficulty has been encountered due to over-reduction in the formation of the leuco compound. This is well illustrated in the case of anthraquinone itself, where considerable quantities of anthranol are produced, the sulfuric acid half esters of which are useless for dyeing purposes, thus reducing both the yield and the purity of the final product and consuming additional hydrosulfite in the reduction of anthraquinone to its leuco form. The anthranol half ester may be represented by the following formula:

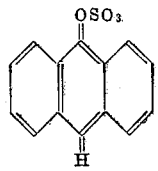

While it is possible to re-oxidize the anthranol half ester, this requires very vigorous oxidation which would be too destructive if used in the presence of a fiber in any practical dyeing operation. In the case of the anthraquinone vat dyes which have a more complex structure and, particularly, those having more than one anthraquinone ring, it is virtually impossible to separate the by-products from the desired compounds, and in many cases this has made the process less attractive with dyestuffs sensitive to over-reduction, as the resulting products give duller shades and, in some cases, show poor fastness. As a result, the improved process of United States Patent 2,403,226 has been somewhat restricted in practice to dyestuffs which do not readily over-reduce.

The preferred process of United States Patent 2,403,226 is a two-step process in which the steps are separate. That is to say, the first step, the production of the leuco anthraquinone compound is substantially completed before the reaction with the sulfur trioxide amine addition product is effected. The reduction to the leuco compound is effected in the normal manner; that is to say, by hydrosulfite under strongly alkaline conditions requiring caustic alkalis. As is well known, under mildly alkaline conditions, such as are obtainable with alkali metal carbonates, the production of leuco compounds does not take place practically for anthraquinone derivatives, but a strong caustic alkali is required. Accordingly, the first step of this prior art has always been carried out in the normal manner, that is by hydrosulfite and caustic alkali, at a pH of around 13 or even higher. Even in the less preferred embodiment where the reduction was carried out simultaneously with esterification, this high pH was deemed necessary for reaction to occur.

According to the present invention, we have found that if the two steps, reduction and esterification, are effected simultaneously, it is possible to operate at a very much lower alkalinity, and under these conditions reduction to the leuco compound does occur in spite of the lower pH. Further, under these pH conditions the undesired over-reductions do not occur, or are very greatly minimized. Improvement in yield and in purity of product are obtainable, and it is possible to prepare economically, in good purity, half esters of leuco anthraquinone dyestuffs which hitherto had been impractical by reason of their sensitivity to over-reduction.

The conditions under which the process of the present invention operates are so drastically different from those encountered in the preparation of the leuco compounds in prior processes that it is quite possible that a very different reaction mechanism is followed. After all, the alkalinity is reduced in some cases to one-thousandth of that formerly thought practical for the reduction of anthraquinone derivatives. It has not proven possible up to the present to determine the exact reaction mechanism of the simultaneous reduction and esterification which occurs in the process of the present invention. It is therefore not desired to limit the invention to any particular theory. However, the conditions are so different, and the lack of over-reduction so marked, that it seems very probable that the reactions do not follow the ordinary course. This is confirmed by the fact that with the alkalinity lowered by two or three magnitudes, it is not ordinarily possible to produce leuco compounds in any significant yields by ordinary procedures.

While it is an essential feature of the process of the present invention that the alkalinity is very much less, in the range of that obtainable with alkali metal carbonates, it is an advantage that there does not appear to be any critical narrow pH range. In general, to obtain the advantages of the present invention, the pH should not be allowed to exceed about 11.5. As the reaction proceeds, the pH drops, usually to around 9 or even sometimes slightly less. There is, therefore, a fairly wide pH range and extremely close control is not necessary. Starting pH's from around 10 to 11.5 give the best results.

While it is possible to obtain greatly improved results with practically all anthraquinone compounds by using the simultaneous reduction and esterification process of the present invention, at moderate pH's, we have found that it is possible to further improve the yields, purity and conditions of reaction by the use of small amounts of auxiliary agents in the reaction medium. They appear to catalyze the reaction, making it possible to operate at lower temperature and reduce the viscosity of the reaction mixture. We refer to this effect as "catalytic" because the auxiliary agents do not appear to be consumed to any considerable extent in the reaction. On the other hand, the mechanism by which they influence the course of the reaction is probably quite different from that of many catalysts in other reactions.

One of the classes of catalysts which are useful in the present invention are organic liquids which are inert to the reducing agents used and do not react with the tertiary amine sulfur trioxide compound. They should also probably not have high water-solubility so that they are not miscible with the salt solution which forms in the reaction mixture. Among the organic liquids which may be used are aromatic hydrocarbons such as benzene and its homologues and their liquid chlorinated derivatives, chlorinated aliphatic liquids such as carbon tetrachloride, chloroform, trichloroethylene and the like, ketones, ethers and esters such as methyl-ethyl ketone, acetophenone, cyclohexane, dibutyl ether, amyl acetate, ethyl benzoate, and the like. Other inert organic liquids which may be employed are tertiary amines as pyridine, quinoline, dimethylaniline and the like, liquid nitriles such as benzonitrile and oxygen-containing heterocyclic liquids such as furan.

Another type of catalyst which appears to act somewhat differently, is the sulfonic acids of the benzene and naphthalene series, such as benzene sulfonic acid, toluene sulfonic acids, xylene sulfonic acids, chlorobenzene sulfonic acids, and sulfonic acids of dimethylaniline, anisole, naphthalene, chloronaphthalenes and naphthyl methyl ethers. These sulfonic acids are normally used in the form of their alkali metal salts which are all readily soluble in the aqueous reaction medium. The effect of the sulfonates appears to include as at least one factor, an inhibitory effect on the decomposition of the amine-sulfur trioxide compounds. Many of the sulfonates are well known to be powerful hydrotropic substances, and the tendency to increase the fluidity of the reaction mixture and to permit smoother reaction is probably another important factor in the effect of these catalysts to increase the yield of the desired sulfuric acid half ester.

It is probable that the decrease in viscosity which seems to be common to both classes of catalysts may result from entirely different reasons. It is probable that the organic liquids exert solvent effects as such, whereas it is most probable that the sulfonates act by reason of their strong hydrotropic properties. In any event, both catalysts increase the fluidity of the reaction mixture.

The use of a single catalyst, or of a single type of catalyst, is often sufficient and makes the addition of the other type of catalyst unnecessary. However, there are many cases in which it is advantageous to use members of both classes of catalyst and such mixtures are included in the invention.

It should be understood that the major improved effects of the present invention are due to its essential features of simultaneous reduction and esterification at pH below 11.5, and the presence of catalysts in small amounts merely enhances the improved effects of the essential broad features of the invention.

The invention will be described in greater detail in connection with typical examples; the parts are by weight.

*Example 1*

16.7 parts of an aqueous anthraquinone paste containing 6.1 parts of anthraquinone is stirred with 1.5 parts of chlorobenzene (or ethyl benzoate), 35 parts of water, and 15.6 parts of sodium carbonate, air being excluded. 16.3 parts of triethylamine-sulfur trioxide and 6.6 parts of sodium hydrosulfite are added and the mixture is stirred for four hours at 50°. After distillation of the amine the mixture is clarified to give a filtrate containing a high yield of the disulfuric ester of anthrahydroquinone. In this reaction, in which the pH does not exceed 11.5, substantially no anthranol ester is formed, while the high pH procedure gives considerable quantities of this undesirable by-product, which can not be re-oxidized in the ordinary way back to anthraquinone. This is clearly demonstrated by the following procedure, which is not intended to illustrate, necessarily, the best results that can be obtained according to the present invention under optimum conditions, but rather to illustrate the effect of milder alkalinity on the reaction, all other conditions being equal.

6.3 parts of anthraquinone were acid pasted in sulfuric acid in the usual way, then being drowned, filtered and washed to give 17.7 parts of press cake. This was then stirred to a smooth slurry with 33 parts of water, 19.1 parts of sodium carbonate, and .96 part of dimethylaniline. The pH of the resulting mixture was 11.29. There was then added 22.2 parts of the sulfur trioxide compound of triethylamine, and 6.4 parts of sodium hydrosulfite. The mixture was then stirred at a temperature of 45°–50° C., while periodic pH readings were taken. The following values were observed:

| Time: | pH |
|---|---|
| 1 minute | 10.56 |
| 3 minutes | 10.40 |
| 13 minutes | 10.6 |
| 21 minutes | 10.23 |
| 28 minutes | 9.67 |
| 43 minutes | 9.42 |
| 53 minutes | 8.84 |
| 68 minutes | 8.82 |
| 88 minutes | 8.78 |
| 2 hours | 8.76 |
| 3 hours | 8.73 |

The relative constancy of the pH indicated that the reaction was complete in about one hour. The reaction mixture was then treated with 70 parts of 5N sodium hydroxide and freed of triethylamine by steam distillation. The residual slurry was diluted somewhat, aerated thoroughly to reoxidize any unesterified anthrahydroquinone, heated and filtered. The recovered anthraquinone was washed and dried. It amounted to 2.4 parts, or a recovery of 38%. The filtrate was thoroughly cooled. The failure of any solid to separate at this point proved the substantial absence of anthranol ester. The filtrate contained a 60% yield of the disulfuric ester of anthrahydroquinone, as confirmed by acidification and oxidation with ferric chloride to recover the anthraquinone. When this procedure was repeated, the only change being that the sodium carbonate was replaced by 5.3 parts of sodium hydroxide and 12.7 parts of sodium carbonate, the following pH values were observed:

| Time: | pH |
|---|---|
| 5 minutes | above 13 |
| 9 minutes | 12.78 |
| 12 minutes | 10.79 |
| 14 minutes | 10.58 |
| 17 minutes | 9.98 |
| 22 minutes | 9.42 |
| 30 minutes | 9.47 |
| 45 minutes | 9.38 |
| 70 minutes | 9.24 |
| 90 minutes | 9.26 |

The reaction was also continued for about three hours altogether, but here again the relative constancy of the pH values indicated that esterification was complete in about an hour. The reaction mixture was worked up as described. In this case 2.8 parts, or 44.4%, of the anthraquinone was recovered unreacted. When the filtrate was cooled, it deposited 15.8% of anthranol sulfuric ester, as shown by hydrochloric acid hydrolysis to the free anthranol. The yield of the desired disulfuric ester of anthrahydroquinone in this case was only 36.5%.

*Example 2*

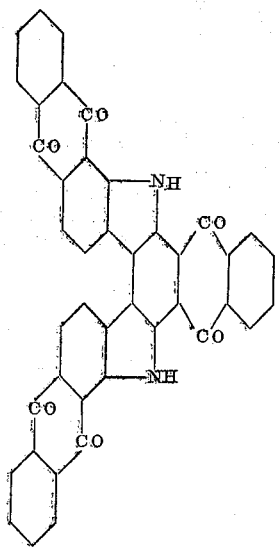

12.2 parts of the dyestuff of the above formula is stirred with 5.6 parts of sodium xylenesulfonate (or sodium beta-naphthalenesulfonate) in 106 parts of water. With stirring, 63.6 parts of sodium carbonate is added and the temperature is adjusted to 50°. A stream of nitrogen is passed through the reaction vessel and then 65.2 parts of triethylamine-sulfur trioxide and 23.2 parts of sodium hydrosulfite are added. The mixture is stirred at 50° in a closed vessel until completion of the reaction. 200 parts of 20% sodium hydroxide is then added and the amine distilled out. The residue is filtered to remove inorganic salts and the filter cake added to 400 parts of water. The slurry is clarified at 60° and the product salted from the filtrate with potassium chloride. The yield of sulfuric ester is very high.

At higher pH the results are markedly inferior, both with respect to the yield and purity of product.

*Example 3*

The procedure of Example 2 is repeated, using five parts of sodium N,N-dimethylaniline-p-sulfonate in place of the xylene sulfonate. The ester is obtained in good yield. Similar results are also obtained if the triethylamine-sulfur trioxide is replaced by 75 parts of the sulfur trioxide compound of cyclohexyldimethylamine.

*Example 4*

43.3 parts of alpha-chloroanthraquinone moist filter cake, of 7.26 parts dry content, is stirred to a paste with 17 parts of water, 1.5 parts of dimethylaniline (or dibutyl ether), and .2 part of sulfonated detergent. 19.1 parts of sodium carbonate is added and the mixture is stirred at 50° in the absence of air. There is then added 6.4 parts of sodium hydrosulfite and 22.2 parts of triethylamine-sulfur trioxide. The reaction is completed by stirring at 45–50° for approximately three hours. The mixture is then made alkaline with 5N sodium hydroxide and freed of amine by distillation. The residue is filtered and chilled to crystallize the chloroanthranol ester, which is removed by filtration. The filtrate contains the disulfate ester of chloroanthrahydroquinone. It can be salted out or reoxidized to regenerate the starting material.

When the vatting and esterification are carried out at higher pH, a much higher proportion of anthranol derivative is formed, with correspondingly lower yield of the desired leuco ester.

Example 5

8.9 parts of 2-acetylamino-3-chloroanthraquinone is esterified in the same manner as described in Example 1. The diester is isolated in good yield. Similar results are obtained if the sulfur trioxide compound of N-ethylmorpholine is used instead of that of triethylamine.

Example 6

10.3 parts of 2-acetylamino-3-bromoanthraquinone is stirred in 42 parts of water with one part of dimethylaniline and 19.1 parts of sodium carbonate. The slurry is warmed to 50° and 22.0 parts of triethylamine-sulfur trioxide and 6.0 parts of sodium hydrosulfite are added, air being excluded from the reaction vessel. After three hours stirring at 50°, 52 parts of 10% sodium hydroxide is added and the triethylamine distilled out under reduced pressure. The residue is diluted and clarified at 60°. An excellent yield of diester of leuco 2-acetylamino-3-bromoanthraquinone is salted from the filtrate with potassium chloride.

Example 7

67.4 parts of an aqueous paste of the gray vat dye described in U. S. Patent 2,456,589, containing 17.6 parts real dye, is stirred with 38 parts of water, four parts sodium xylenesulfonate (or anisolesulfonate), and 2.0 parts of dimethylaniline. The slurry is treated with 29.6 parts of sodium carbonate, and while the temperature is kept at 50°, 29 parts of triethylamine-sulfur trioxide and 12.5 parts of sodium hydrosulfite are added. After stirring at 50° for three hours, 80 parts of 20% sodium hydroxide is added and the amine distilled out. The residue is diluted with 700 parts of water and clarified at 65–70°. The product is salted from the filtrate with sodium chloride in essentially quantitative yield. When higher pH is employed, lower yields are obtained.

Example 8

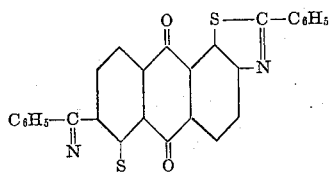

70.5 parts (14.2 parts real dye) of an aqueous paste of the above dyestuff is mixed with 22.2 parts sodium carbonate, one part of dimethylaniline (or xylene) and 40 parts of water. After stirring to a smooth paste, 28.4 parts of triethylamine-sulfur trioxide and 7.0 parts of sodium hydrosulfite are added. The mixture is stirred at 50° in a closed vessel until esterification is complete. 50 parts of a 20% solution of sodium hydroxide is then added and the amine distilled out. The mixture is diluted with water and clarified at 85° in the presence of a filter aid. The product is salted from the filtrate in essentially quantitative yield. It dyes cotton in brilliant greenish yellow shades.

When the dye is vatted and esterified at high pH, the solubilized product is obtained in low yield and gives duller dyeings.

Example 9

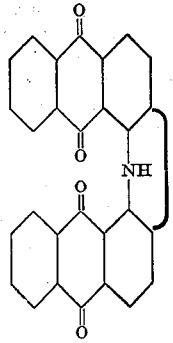

68.5 parts of aqueous paste of the dyestuff of the above formula, containing 8.5 parts real dye, is stirred with 30 parts of water, 25.4 parts sodium carbonate and 10 parts of pyridine. The slurry is warmed to 45° in a nitrogen atmosphere and 28.8 parts of triethylamine-sulfur trioxide and 8.5 parts of sodium hydrosulfite added. The reaction is completed by stirring at 45–48° C., after which 88 parts of 5N sodium hydroxide is added and the amine distilled out. The residue is diluted and clarified, and the product salted out with potassium carbonate.

Similar results are obtained if the triethylamine-sulfur trioxide is replaced by 42.5 parts of tributylamine-sulfur trioxide.

Example 10

A mixture of 15.8 parts of 2(p-toluyl)anthraquinone, 42.4 parts of soda ash, and two parts of dimethylaniline in 79 parts of water is stirred in a nitrogen atmosphere and heated to 45–50° C. There is then added 11.6 parts of sodium hydrosulfite and 54.4 parts of triethylamine-sulfur trioxide. After stirring for four hours, the mixture is cooled and treated with 120 parts of 20% sodium hydroxide solution. Excess hydrosulfite is then destroyed by aeration. The amine is removed by distillation and the product isolated in the usual way, by salting with potassium chloride. An excellent yield is obtained.

Example 11

25 parts of 1-phenoxyanthraquinone press cake (containing 15.0 parts on a dry basis) is stirred with 42.4 parts of soda ash and one part of dimethylaniline (or anisole) in 65 parts of water, heated to 50° C., and treated with 54.4 parts of triethylamine-sulfur trioxide and 11.6 parts of sodium hydrosulfite. After four hours, the mixture is treated with 80 parts of 20% sodium hydroxide solution, aerated to destroy excess hydrosulfite, and freed of amine by distillation under reduced pressure. The product is isolated by the method described above.

Example 12

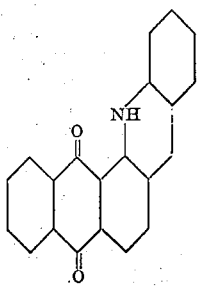

An aqueous press cake containing 13.2 parts of 1,2-phthaloylcarbazole, 110 parts of water, and a trace of sulfonated detergent, is stirred and heated to 45°–50° C. with 42.4 parts of soda ash and one part of dimethylaniline, and treated with 54.4 parts of triethylamine-sulfur trioxide and 11.6 parts of sodium hydrosulfite. After four hours, the mixture is cooled, treated with 120 parts of 20% sodium hydroxide solution, aerated to destroy excess hydrosulfite, and freed of amine by distillation under reduced pressure. The residue is then thoroughly aerated at 50° C. giving a precipitate of a small amount of unesterified starting material. The solution is thoroughly cooled and filtered, and the product salted out by the addition of 190 parts of potassium chloride. An excellent yield is obtained. The product may be purified by resalting from aqueous solution.

*Example 13*

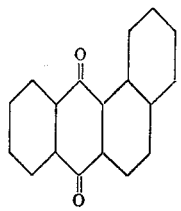

A press cake containing 12.9 parts of 1,2-benzanthraquinone and 26 parts of water is stirred and heated to 45–50° C. with 42.4 parts of soda ash and one part of dimethylaniline (or ethyl benzoate) in 38 parts of water, and then treated with 54.4 parts of triethylamine-sulfur trioxide and 11.6 parts of sodium hydrosulfite. After four hours, the cream-colored slurry is cooled to room temperature, treated with 120 parts of 20% sodium hydroxide solution, aerated to destroy remaining hydrosulfite, and freed of amine by distillation under reduced pressure. The remaining solution is again aerated and filtered, and then treated with potassium chloride to salt out the product, which is obtained in excellent yield. It may be purified by redissolving in water and resalting with potassium chloride.

We claim:

1. A process for the manufacture of water-soluble, sulfuric half ester salts of leuco anthraquinone compounds, which comprises subjecting the anthraquinone compound in an alkaline, aqueous medium, having a pH not greater than 11.5, to simultaneous reduction with a reducing agent, and esterification with a sulfur trioxide addition compound of a tertiary amine, having a dissociation constant of at least $1 \times 10^{-7}$ at 25° C.

2. A process according to claim 1 in which the anthraquinone compound is a 2-acylaminoanthraquinone.

3. A process according to claim 2 in which the 2-acylaminoanthraquinone is substituted by halogen in the 3 position.

4. A process according to claim 3 in which the esterification is effected with the sulfur trioxide addition compound of triethylamine.

5. A process according to claim 4 in which the reaction medium contains small amounts of dimethylaniline.

6. A process according to claim 1 in which the anthraquinone has the structure:

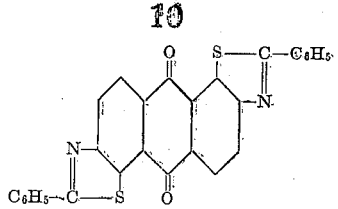

7. A process according to claim 6 in which esterification is effected with the sulfur trioxide compound of triethylamine.

8. A process according to claim 7 in which the reaction medium contains catalytic amounts of dimethylaniline.

9. A process according to claim 1 in which the anthraquinone has the structure:

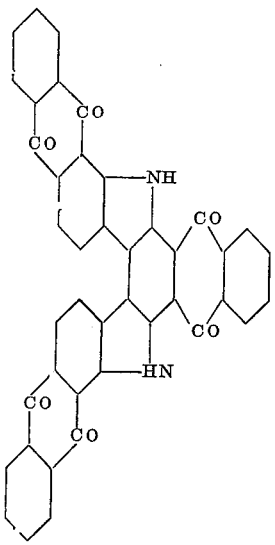

10. A process according to claim 9 in which esterification is effected with the sulfur trioxide compound of triethylamine.

11. A process according to claim 10 in which the reaction medium contains xylenesulfonic acid.

12. A process according to claim 1 in which the anthraquinone is the gray vat dyestuff obtained by chlorinating benzanthrone in sulfuric acid of 85–100% concentration at temperatures between 10° and 50° C. until a sample precipitated by water shows a chlorine content between 11.5 and 13.5%, discontinuing the chlorination and recovering the so chlorinated benzanthrone mixture containing 11.5 to 13.5% combined chlorine, condensing the said chlorinated benzanthrone mixture with approximately one molecular equivalent of alpha-amino anthraquinone in nitrobenzene in the presence of an acid-binder and a cupriferous catalyst to produce a mixture of secondary amines and recovering the mixture of secondary amines so produced and subjecting said mixture of secondary amines thus produced to fusion with alcoholic caustic alkali.

13. A process according to claim 12 in which esterification is effected with the sulfur trioxide compound of triethylamine.

14. A process according to claim 13 in which the reaction medium contains xylenesulfonic acid and catalytic amounts of dimethylaniline.

15. A process according to claim 1 in which the reaction medium contains a small amount of a water-insoluble organic liquid inert under the conditions of the reaction.

16. A process according to claim 1 in which the reaction medium contains a small amount of an aromatic sulfonate selected from the group consisting of benzene sulfonates and ethylene sulfonates.

17. A process for the manufacture of water-soluble, sulfuric half ester salts of leuco anthraquinone compounds, which comprises subjecting the anthraquinone compound in an alkaline, aqueous medium, having a pH not greater than 10.56, to simultaneous reduction with a reducing agent and esterification with a sulfur trioxide addition compound of a tertiary amine, having a dissociation constant of at least $1 \times 10^{-7}$ at 25° C.

WILLIAM B. HARDY.
ELIZABETH M. HARDY.

References Cited in the file of this patent

UNITED STATES PATENTS

| Number | Name | Date |
|---|---|---|
| 2,035,362 | Bauer et al. | Mar. 24, 1936 |
| 2,403,226 | Lecher et al. | July 2, 1946 |
| 2,456,589 | Lytte | Dec. 14, 1948 |